(12) United States Patent
Mori

(10) Patent No.: US 11,194,907 B2
(45) Date of Patent: Dec. 7, 2021

(54) INFORMATION PROCESSING APPARATUS, CONTROL METHOD, AND RECORDING MEDIUM

(71) Applicant: Satoshi Mori, Kanagawa (JP)

(72) Inventor: Satoshi Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 128 days.

(21) Appl. No.: 16/749,041

(22) Filed: Jan. 22, 2020

(65) Prior Publication Data

US 2020/0242242 A1 Jul. 30, 2020

(30) Foreign Application Priority Data

Jan. 30, 2019 (JP) .............................. JP2019-014872

(51) Int. Cl.
*G06F 21/00* (2013.01)
*G06F 21/55* (2013.01)
*G06F 21/54* (2013.01)

(52) U.S. Cl.
CPC ............ *G06F 21/554* (2013.01); *G06F 21/54* (2013.01); *G06F 2221/2149* (2013.01)

(58) Field of Classification Search
CPC ................... G06F 21/554; G06F 21/54; G06F 2221/2149; G06F 11/0733; G06F 2212/3035; G06F 3/021
USPC ............................................................. 726/23
See application file for complete search history.

(56) References Cited

U.S. PATENT DOCUMENTS

| 6,711,687 | B1 | 3/2004 | Sekiguchi | |
|---|---|---|---|---|
| 2007/0143861 | A1 | 6/2007 | Ohishi | |
| 2008/0089729 | A1* | 4/2008 | Fujita | G03G 15/553 400/76 |
| 2011/0064431 | A1* | 3/2011 | Kohri | G01R 21/133 399/37 |
| 2011/0231906 | A1* | 9/2011 | Torigoshi | G06F 21/608 726/4 |
| 2012/0026526 | A1* | 2/2012 | Sekine | H04N 1/0044 358/1.13 |
| 2012/0290884 | A1* | 11/2012 | Hamaguchi | G06F 1/00 714/49 |

(Continued)

FOREIGN PATENT DOCUMENTS

| JP | 2004-157961 | 6/2004 |
|---|---|---|
| JP | 2007-189668 | 7/2007 |

(Continued)

OTHER PUBLICATIONS

Extended European Search Report for 20153618.2 dated Jun. 9, 2020.

*Primary Examiner* — Josnel Jeudy
(74) *Attorney, Agent, or Firm* — IPUSA, PLLC

(57) ABSTRACT

An information processing apparatus including at least one device, and circuitry to perform at least one process using the at least one device, which controls access to each device from each process based on access restriction information for setting an access restriction to each device from each process, acquires diagnostic information from each device, detects an abnormal access to a particular device from a particular process based on the diagnostic information, and modifies the access restriction information to prohibit access to the particular device from the particular process when the abnormal access is detected.

5 Claims, 7 Drawing Sheets

(56) References Cited

U.S. PATENT DOCUMENTS

| | | | | |
|---|---|---|---|---|
| 2014/0376027 A1* | 12/2014 | Adachi | ............. | G06K 15/4095 |
| | | | | 358/1.14 |
| 2015/0264088 A1* | 9/2015 | Shimizu | ............. | G06F 21/6218 |
| | | | | 726/1 |
| 2017/0371272 A1* | 12/2017 | Yamamoto | ......... | G03G 15/0863 |
| 2019/0087249 A1* | 3/2019 | Togawa | ............. | H04N 1/00323 |

FOREIGN PATENT DOCUMENTS

| | | |
|---|---|---|
| JP | 2013-101688 | 5/2013 |
| JP | 2017-167781 | 9/2017 |

\* cited by examiner

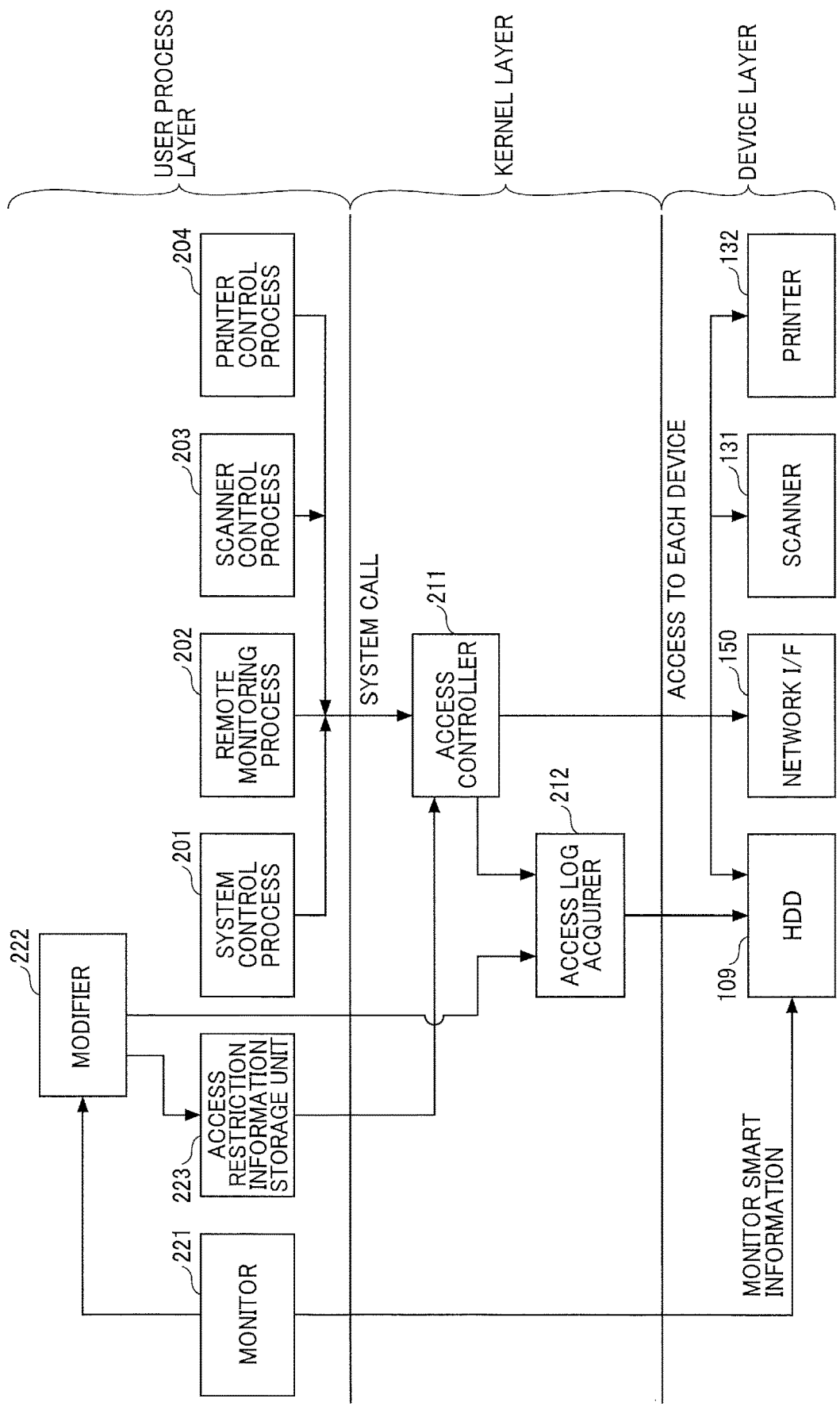

FIG. 3

| PROCESS | ACCESS TARGET | OPERATION | ACCESS CONTROL | LOG |
|---|---|---|---|---|
| SCANNER CONTROL PROCESS | SCANNER | SCAN INSTRUCTION | PERMITTED | NO |
| SCANNER CONTROL PROCESS | SCANNER | IMAGE ACQUISITION | PERMITTED | NO |
| SCANNER CONTROL PROCESS | HDD | IMAGE SAVING | PERMITTED | YES |
| STORAGE MONITORING PROCESS | HDD | SMART INFORMATION ACQUISITION | PERMITTED | YES |
| STORAGE MONITORING PROCESS | HDD | ACCESS LOG REFERENCE | PERMITTED | NO |

300

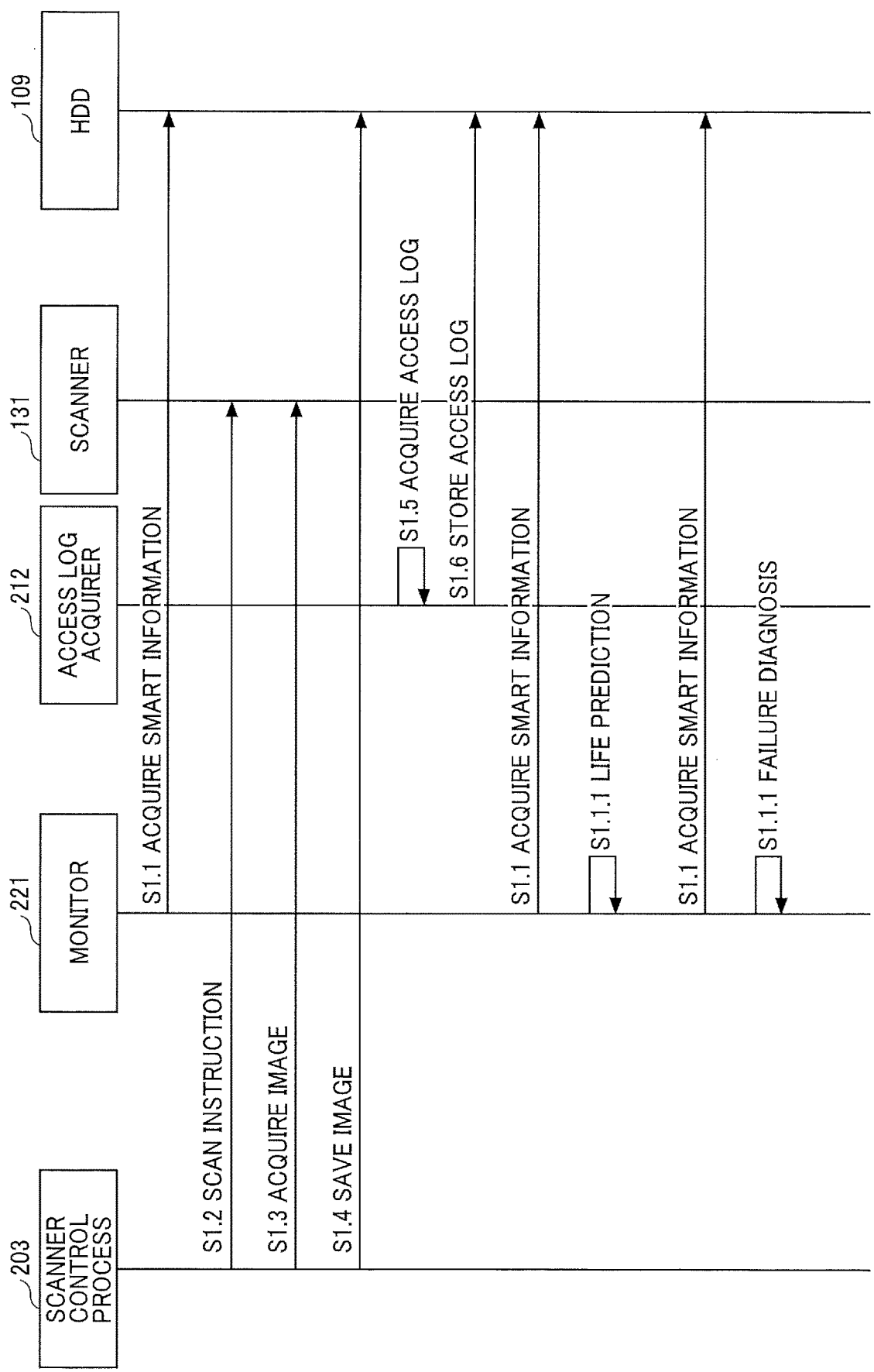

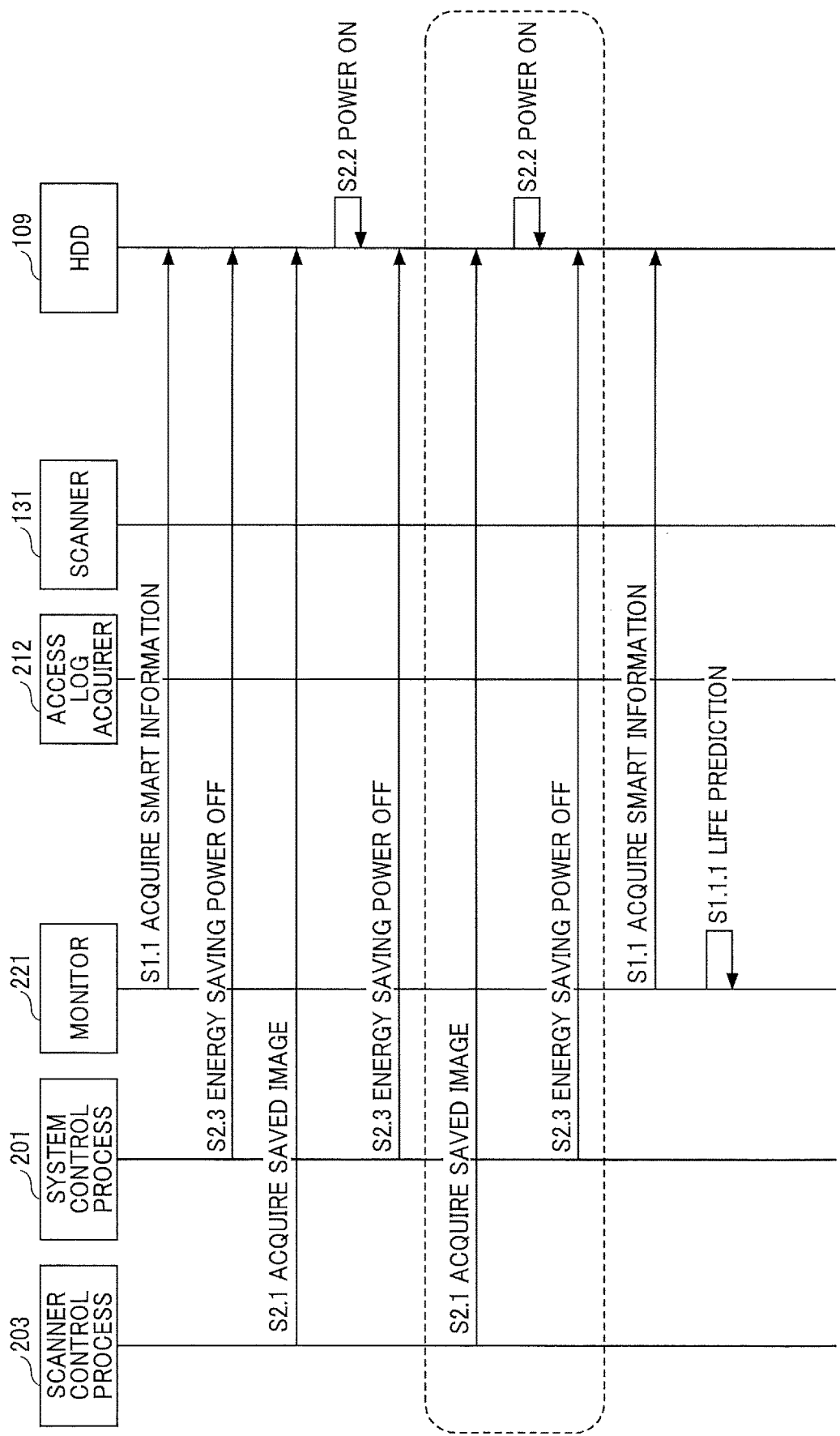

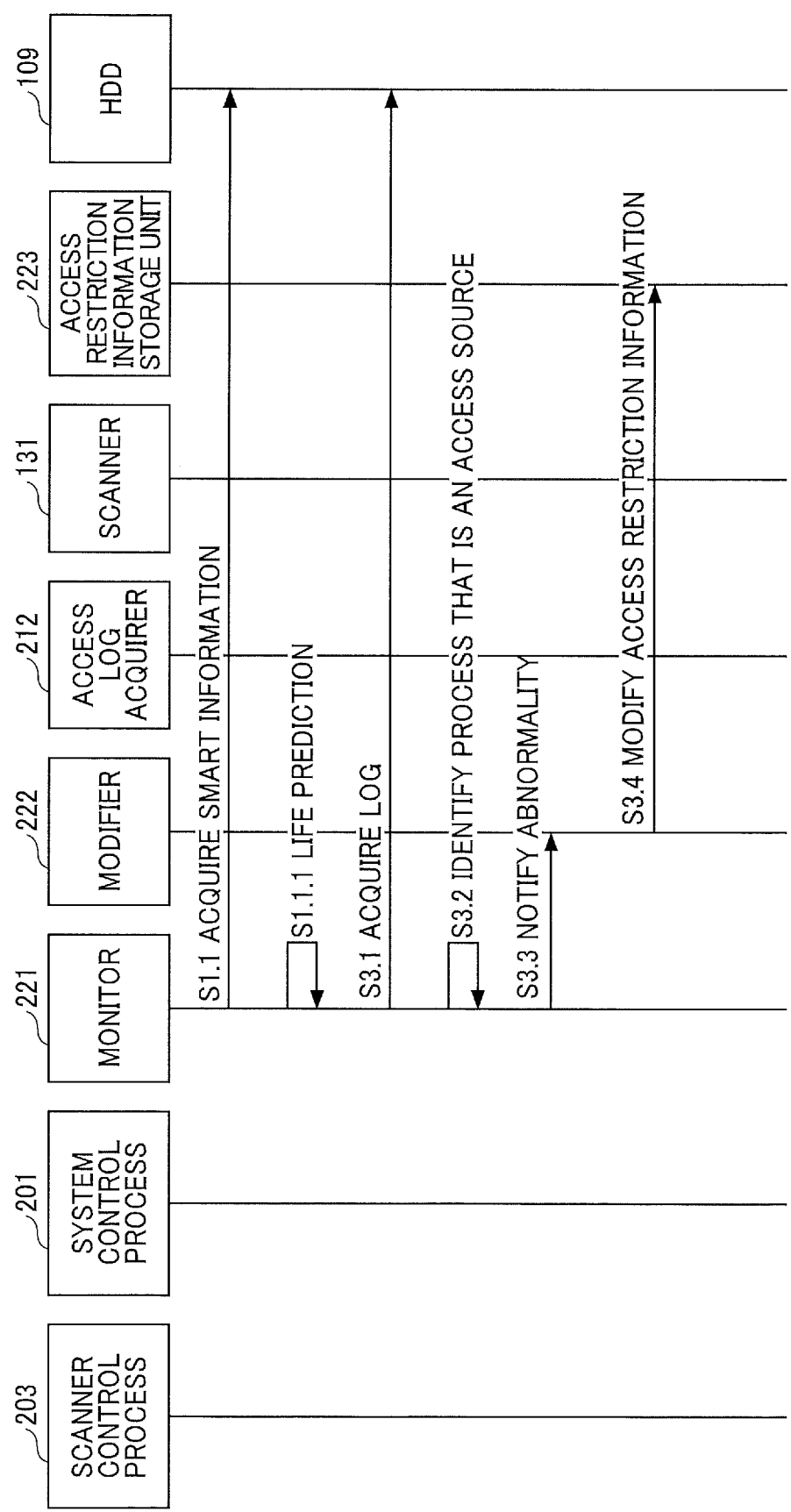

INFORMATION PROCESSING APPARATUS, CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-014872, filed on Jan. 30, 2019, in the Japan Patent Office, the entire disclosure of which is hereby incorporated by reference herein.

BACKGROUND

Technical Field

The present invention relates to an information processing apparatus, a control method, and a recording medium.

Description of the Related Art

In the background art, access restriction information for application programs installed in a multifunction peripheral (MFP) is acquired from an external server, and used to control access from the application program to such as a device driver in the MFP.

However, even if excessive access is made to a device from an application due to various environment changes such as version up or setting change, it is not possible to restrict such abnormal access. This may shorten the life of the device.

SUMMARY

Example embodiments of the present invention include an information processing apparatus including at least one device, and circuitry to perform at least one process using the at least one device, which controls access to each device from each process based on access restriction information for setting an access restriction to each device from each process, acquires diagnostic information from each device, detects an abnormal access to a particular device from a particular process based on the diagnostic information, and modifies the access restriction information to prohibit access to the particular device from the particular process when the abnormal access is detected.

Example embodiments include a method for controlling an information processing apparatus that performs at least one process using at least one device, including: controlling access to each device from each process based on access restriction information for setting an access restriction to each device from each process; acquiring diagnostic information from each device; detecting an abnormal access to a particular device from a particular process on the diagnostic information; and modifying the access restriction information to prohibit access to the particular device from the particular process when the abnormal access is detected.

Example embodiments include a recording medium storing a control program for causing one or more processors to perform the above-described control method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a diagram illustrating a system configuration of the MFP according to the embodiment of the present invention;

FIG. 3 is a diagram illustrating an example of access restriction information used in the MFP according to the embodiment of the present invention;

FIG. 4 is a sequence diagram of a device monitoring process and a scanner process by the MFP according to an embodiment of the present invention;

FIG. 5 is a sequence diagram of a saved image acquisition process by the MFP according to an embodiment of the present invention;

FIG. 6 is a sequence diagram of an access restriction information modification process by the MFP according to an embodiment of the present invention.

Figure 1:
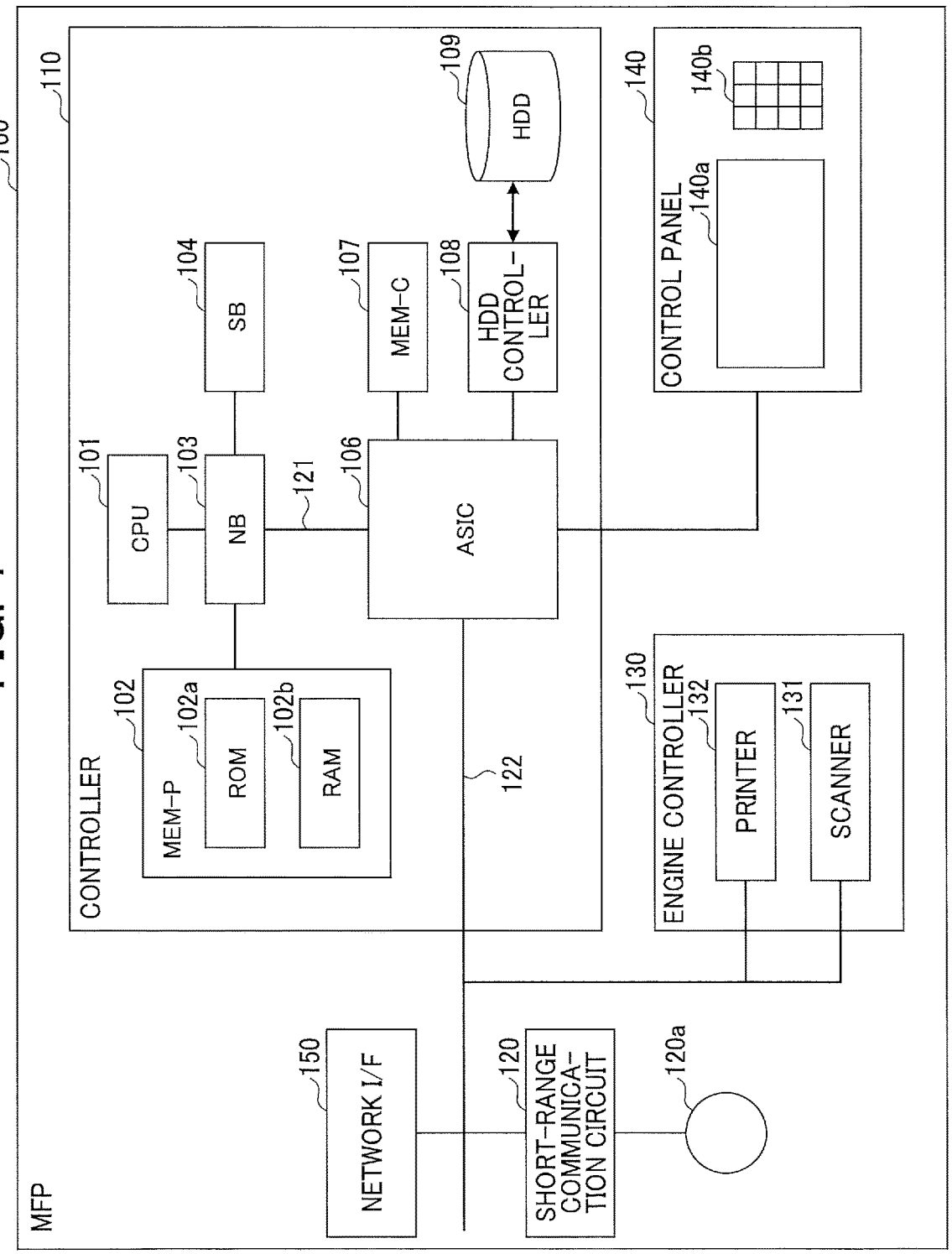
FIG. 1 is a diagram illustrating a hardware configuration of a multifunction peripheral (MFP) according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiment of the present invention will be described with reference to the drawings.

FIG. 1 is a schematic diagram illustrating a hardware configuration of an MFP 100 according to an embodiment of the present invention. As illustrated in FIG. 1, the MFP 100 includes a controller 110, a short-range communication circuit 120, an engine controller 130, a control panel 140, and a network I/F 150.

The controller 110 includes a central processing unit (CPU) 101, a system memory (MEM-P) 102, a north bridge (NB) 103, a south bridge (SB) 104, an application specific integrated circuit (ASIC) 106, and a local memory (MEM-C) 107 as a storage unit, an HDD controller 108, and an HDD 109 as a storage unit. The NB 103 and ASIC 106 are connected by an accelerated graphics port (AGP) bus 121. However, the configuration of the controller 110 is not limited to this. For example, two or more components such as the CPU 101, NB 103, and SB 104 may be achieved by a System on Chip (SoC). In this case, the SoC and ASIC 106 are connected by a Peripheral Component Interconnect (PCI)-express (registered trademark) bus.

The CPU 101 is a controller that controls entire MFP 100. The NB 103 is a bridge for connecting the CPU 101 to the MEM-P 102, SB 104, and AGP bus 121, and includes a memory controller that controls reading and writing to the MEM-P 102, a Peripheral Component Interconnect (PCI) master, and an AGP target.

The MEM-P 102 includes a ROM 102a, which is a memory that stores programs and data used for implementing the functions performed by the controller 110, and used as a memory for deploying the programs and data or for rendering during printing. The programs stored in the RAM 102b may be provided in a format that can be installed or executed on a recording medium that can be read by a computer such as a CD-ROM, a CD-R, and a DVD.

The SB 104 is a bridge for connecting the NB 103 to PCI devices and peripheral devices. The ASIC 106 is an integrated circuit (IC) for image processing applications with hardware for image processing, and has a bridge function to connect the AGP bus 121, a PCI bus 122, the HDD controller 108 and the MEM-C 107 respectively. This ASIC 106 includes a PCI target and an AGP master, an arbiter (ARB) that forms the core of the ASIC 106, a memory controller that controls the MEM-C 107, a plurality of DMACs (Direct Memory Access Controllers) that process rotation of image by a hardware logic or the like, and a PCI unit that transfers data between a scanner 131 and a printer 132 via the PCI bus 122. The ASIC 106 may be connected to a universal serial bus (USB) interface or an Institute of Electrical and Electronics Engineers 1394 (IEEE1394) interface.

The MEM-C 107 is a local memory used as a copy image buffer and a code buffer. The HDD 109 is a storage for storing image data, font data used during printing, and a faun. The HDD 109 controls reading or writing of data to the HDD 109 according to the control of the CPU 101. The AGP bus 121 is a bus interface for a graphics accelerator card provided to speed up graphics processing, and can access the MEM-P 102 directly with high throughput, thereby speeding up processing by the graphics accelerator card.

The short-range communication circuit 120 includes a short-range communication circuit 120a. The short-range communication circuit 120 is a communication circuit such as near field communication (NFC) or Bluetooth (registered trademark).

The engine controller 130 includes the scanner 131 and the printer 132. The controller 110 controls the entire MFP 100, and controls, for example, drawing, communication, input from the control panel 140, and the like. The scanner 131 or the printer 132 includes an image processor that performs various image processing such as error diffusion and gamma conversion.

The MFP 100 can sequentially switch and select a document box function, a copy function, a printer function, and a facsimile function by the application switching key of the control panel 140. When the document box function is selected, the MFP 100 operates in the document box mode. When the copy function is selected, the MFP 100 operates in the copy mode. When the printer function is selected, the MFP 100 operates in the printer mode. When the facsimile function is selected, the MFP 100 operates in the facsimile mode.

The network I/F 150 is an interface for data communication using a communication network. The short-range communication circuit 120 and the network I/F 150 are electrically connected to the ASIC 106 via the PCI bus 122.

FIG. 2 is a schematic diagram illustrating a system configuration of the MFP 100 according to the embodiment of the present invention.

As illustrated in FIG. 2, the MFP 100 includes a system control process 201, a remote monitoring process 202, a scanner control process 203, and a printer control process 204 in the user process layer. In this disclosure, one or more processes to be performed by the MFP 100 depends on application installed on the MFP 100.

The system control process 201 manages the power state of each device. For example, the system control process 201 may transition each device from a normal power state to a power saving state when the user operation for the MFP 100 is not performed for a predetermined time. In this example, the device is any one of devices in the MFP 100 such as the scanner 131, printer 132, HDD 109, network I/F 150, etc. However, the devices to be included in the information processing apparatus depend on functions of the information processing apparatus.

The remote monitoring process 202 controls a remote monitoring process for monitoring an external device. The remote monitoring process includes access to a device (for example, the network I/F 150) required for the remote monitoring process.

The scanner control process 203 controls a scanner process. The scanner process includes access to a device (for example, the scanner 131, HDD 109, etc.) required for the scanner process.

The printer control process 204 controls a printer process. The printer process includes access to a device (for example, the printer 132) required for the printer process.

In addition, as illustrated in FIG. 2, the MFP 100 includes an access controller 211 and an access log acquirer 212 in the kernel layer.

When a system call for accessing the device from at least one of the processes 201 to 204 is made, the access controller 211 determines whether to permit the system call based on the access restriction information stored in an access restriction information storage unit 223.

When the at least one of the processes 201 to 204 accesses a device, the access log acquirer 212 determines whether to acquire an access log based on the access restriction information stored in the access restriction information storage unit 223. When determining that the access log is to be acquired, the access log acquirer 212 acquires the access log and records the access log in a predetermined storage medium (the HDD 109 in this embodiment).

In addition, as illustrated in FIG. 2, the MFP 100 includes a monitor 221, a modifier 222, and the access restriction information storage unit 223 in the user process layer.

The monitor 221 periodically acquires SMART information (an example of "diagnostic information") held by the HDD 109. Then, the monitor 221 detects an abnormal access to the HDD 109 from any process 201 to 204 based on the acquired SMART information. The SMART information is an example of diagnostic information, which indicates such as a number of times the power of the HDD 109 is turned ON/OFF and the operating time of the HDD 109. If detecting an abnormal access to the HDD 109, the monitor 221 sends to the modifier 222 an instruction to prohibit access to the HDD 109 by a process (any process 201 to 204) that has performed the abnormal access. The monitor 221 may also perform monitoring other storage devices other than the HDD 109 (that is, diagnostic information acquisition, abnormal access detection, access prohibition instructions, etc.).

The modifier 222 modifies the access restriction information stored in the access restriction information storage unit 223 in accordance with an instruction from the monitor 221. For example, if the monitor 221 detects an abnormal access to the HDD 109, the modifier 222 modifies the access restriction information of the process (any process 201 to 204) that has performed the abnormal access, which is stored in the access restriction information storage unit 223, in accordance with an instruction from the monitor 221, thereby prohibiting access to the HDD 109 by the process.

The access restriction information storage unit 223 stores the access restriction information in any desired memory. The access restriction information is information in which whether to permit access to a device and whether to acquire an access log when accessing the device are set for each process (any process 201 to 204). A specific example of the access restriction information will be described later with reference to FIG. 3. The access restriction information may be previously stored, for example, by the system administrator.

Each function of the embodiment described above is achieved by the CPU 101 (computer) executing a program stored in various storage devices (the ROM 102a, RAM 102b, etc.) in the MFP 100. This program may be provided in a state of being installed in the MFP 100 in advance, or may be provided from the outside and installed in the MFP 100. In the latter case, this program may be provided in an external storage medium (e.g., a USB memory, a memory card, a CD-ROM, etc.), or provided by downloading from a server on a network (e.g., the Internet, etc.).

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

FIG. 3 is a diagram illustrating an example of the access restriction information used in the MFP 100 according to the embodiment of the present invention. Access restriction information 300 illustrated in FIG. 3 is an example of the access restriction information stored in the access restriction information storage unit 223.

As illustrated in FIG. 3, the access restriction information 300 includes a plurality of records in the form of a table, and each record includes "PROCESS", "ACCESS TARGET", "OPERATION", "ACCESS CONTROL", and "LOG" as data items.

The "PROCESS" is set with the identification information (name, ID, etc.) of a process that is an access source to a device. The "ACCESS TARGET" is set with the identification information (a name, an ID, etc.) of the device to be accessed from the process. The "OPERATION" is set with the operation content for the access target from the process. The "ACCESS CONTROL" is set with the information indicating whether to permit access. The "LOG" is set with the information indicating whether to acquire an access log.

Specifically, the access restriction information 300 is set with whether to permit access and whether to acquire an access log for each combination of an access source process, an access target device, and the operation content for an access target.

FIG. 4 is a sequence diagram of a device monitoring process and a scanner process by the MFP 100 according to an embodiment of the present invention.

As illustrated in FIG. 4, the monitor 221 periodically acquires the SMART information from the HDD 109 (S1.1), and performs processing of life prediction and failure diagnosis on the HDD 109 based on the acquired SMART information (S1.1.1).

The scanner control process 203 transmits a scan instruction to the scanner 131 (S1.2), acquires a scan image from the scanner 131 (S1.3), and saves the acquired image in the HDD 109 (S1.4).

At this time, in the access restriction information 300 illustrated in FIG. 3, "PERMITTED" is set in the "ACCESS CONTROL" for each of the scan instruction ("OPERATION") and the image acquisition ("OPERATION") from the scanner control process 203 ("PROCESS") to the scanner 131 ("ACCESS TARGET"). Thus, the access controller 211 permits access. However, since "NO" is set in the "LOG" for both of the processes, the access log acquirer 212 does not acquire an access log.

In the access restriction information 300 illustrated in FIG. 3, "PERMITTED" is set in the "ACCESS CONTROL" for the image saving ("OPERATION") from the scanner control process 203 ("PROCESS") to the HDD 109 ("ACCESS TARGET"). Thus, the access controller 211 permits access. Since "YES" is set in the "LOG" for this process, the access log acquirer 212 acquires an access log each time the image saving process is performed (S1.5), and stores the access log in the HDD 109 (S1.6).

FIG. 5 is a sequence diagram of a saved image acquisition process by the MFP 100 according to an embodiment of the present invention. FIG. 5 illustrates the sequence of the saved image acquisition process in which the scanner control process 203 acquires a saved image from the HDD 109.

The monitor 221 periodically acquires the SMART information from the HDD 109 (S1.1). Here, the HDD 109 is in a POWER OFF state according to an instruction from the system control process 201 (S2.3).

The scanner control process 203 accesses the HDD 109 and acquires a saved image from the HDD 109 (S2.1). In response to access from the scanner control process 203, the HDD 109 transitions to a POWER ON state (S2.2). After a predetermined time, the HDD 109 transitions to a POWER OFF state under the control of the system control process 201 (S2.3).

When an abnormality occurs in the scanner control process 203 or a process related to the scanner control process 203, the scanner control process 203 repeats the access to the HDD 109 (S2.1) as illustrated by a dotted line in FIG. 5.

By the repeated access from the scanner control process 203, the HDD 109 will unnecessarily repeat the transition to the POWER ON state (S2.2) and the transition to the POWER OFF state (S2.3). Consequently, the HDD 109 consumes power wastefully and shortens the life.

As illustrated in FIG. 5, during such a saved image acquisition process, the monitor 221 periodically acquires the SMART information from the HDD 109 (S1.1), and performs life prediction and failure diagnosis on the HDD 109 based on the acquired SMART information (S1.1.1). In the SMART information acquired from HDD 109, as the transition to the POWER ON state of the HDD 109 is repeated as described above, the number of times the power of the HDD 109 is turned on will increase.

FIG. 6 is a sequence diagram of an access restriction information modification process by the MFP 100 according to an embodiment of the present invention.

As illustrated in FIG. 6, the monitor 221 periodically acquires the SMART information from the HDD 109 (S1.1), and performs life prediction and failure diagnosis on the HDD 109 based on the operating time of the HDD 109 and the number of times the power of the HDD 109 is turned ON/OFF indicated in the acquired SMART information (S1.1.1).

In addition, the monitor 221 acquires the access log stored in the HDD 109 (S3.1), and when an abnormal access to a device is detected based on the acquired access log, the monitor 221 can identify a process that is an access source to the device (S3.2).

For example, if the monitor 221 detects an abnormal access to the HDD 109 based on the SMART information, the monitor 221 can identify the process that is the access source to the HDD 109 based on the access log.

For example, if an abnormal access that rapidly increases the number of times the power of the HDD 109 is turned ON/OFF is detected in a predetermined period, the monitor 221 can determine that a process with the highest number of accesses to the HDD 109 within that period is the process that has performed the abnormal access.

When detecting an abnormal access to the HDD 109, the monitor 221 notifies the modifier 222 of the occurrence of the abnormal access and instructs to prohibit access to the HDD 109 from the process that has performed the abnormal access (S3.3). The modifier 222 modifies the access restriction information 300 to prohibit access to the HDD 109 from the process that has performed abnormal access to the HDD 109 in accordance with the instruction from the monitor 221 (S3.4).

Figure 7:
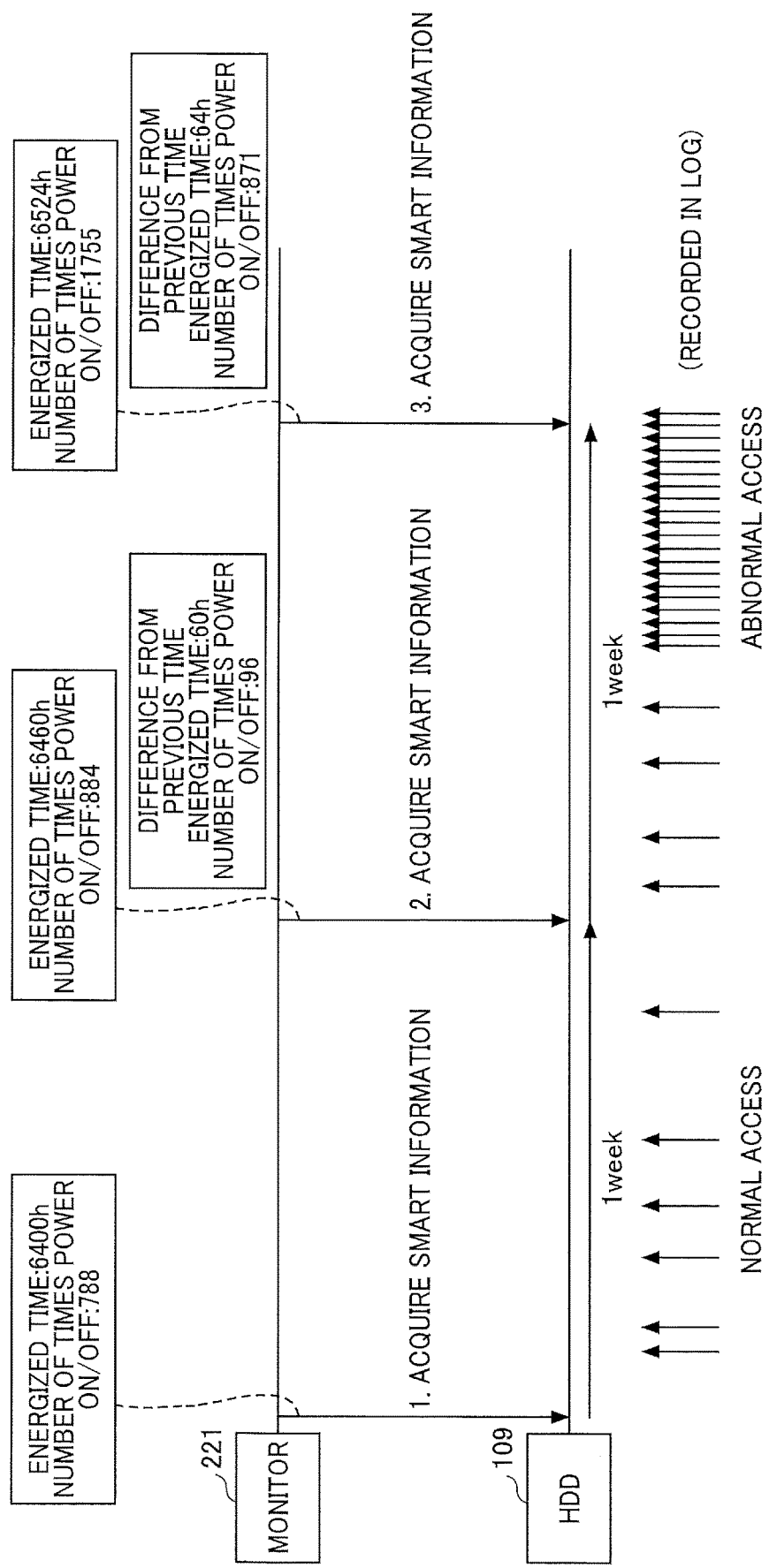
FIG. 7 is a diagram for explaining a method for detecting an abnormal access by the MFP according to the embodiment of the present invention.

FIG. 7 is a diagram for explaining operation of detecting the abnormal access by the MFP 100 according to an embodiment of the present invention.

For example, as illustrated in FIG. 5, when an abnormal access to the HDD 109 from the scanner control process 203 is repeated, the power ON/OFF of the HDD 109 is repeated.

In this case, the monitor 221 can detect the abnormal access to the HDD 109 based on the number of times the power of the HDD 109 is turned ON/OFF indicated in the SMART information. For example, if the number of times the power of the HDD 109 is turned ON/OFF is equal to or greater than a predetermined threshold, the monitor 221 determines that an abnormal access to HDD 109 has occurred.

For example, in the example illustrated in FIG. 7, the monitor 221 acquires the SMART information from the HDD 109 each week. In addition, in the example illustrated in FIG. 7, in the SMART information acquired by the monitor 221 for the third time, "1755 (times)" is set to the number of times the power of the HDD 109 is turned ON/OFF. The monitor 221 calculates "871 (times)" as the difference from the previous number of times the power of the HDD 109 is turned ON/OFF. The monitor 221 can determine that an abnormal access to the HDD 109 has occurred during the most recent week if this "871 (times)" is greater than or equal to a predetermined threshold value. Moreover, the monitor 221 can identify, based on the access log, that this abnormal access is due to the scanner control process 203.

Then, when detecting an abnormal access to the HDD 109 by the scanner control process 203, the monitor 221 instructs the modifier 222 to prohibit the access to the HDD 109 by the scanner control process 203. Accordingly, the modifier 222 modifies the access restriction information 300 to prohibit the access to the HDD 109 by the scanner control process 203.

For example, the modifier 222 may prohibit the access to the HDD 109 by the scanner control process 203 and then permit the access to the HDD 109 by the scanner control process 203 again after a predetermined time has elapsed.

In addition, the modifier 222 may prohibit the access to the HDD 109 by the scanner control process 203 and then permit the access to the HDD 109 by the scanner control process 203 again when a predetermined operation is performed by a service personnel or a user.

In addition, for example, if the monitor 221 or the modifier 222 prohibits the access to the HDD 109 by the scanner control process 203, the monitor 221 or the modifier 222 may notify the user through the control panel 140 or the like that the prohibition has been made or may notify the PC or the like installed in a service center via a network.

As described above, the MFP 100 according to the above-described embodiments of the present invention includes an access restriction information storage unit 223 that stores access restriction information in which an access restriction to a device from a process is set, an access controller 211 that controls access to the device from the process based on the access restriction information, a monitor 221 that acquires SMART information (diagnostic information) from the device and detects an abnormal access to the device from the process based on the SMART information, and a modifier 222 that modifies the access restriction information to prohibit access to the device from the process when the abnormal access is detected by the monitor 221.

With this configuration, if the MFP 100 is excessively accessed from an application to a device due to, for example, various environmental changes such as version up and setting change, such abnormal access can be restricted. Therefore, the MFP 100 can extend the life of the device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

In this disclosure, the MFP is an example of the information forming apparatus. The information processing apparatus is not limited to an image forming apparatus. For example, the information processing apparatus can be a projector (PJ), an interactive white board (IWB: white board with electronic blackboard function capable of mutual communication), a digital signage, a head up display (HUD), an industrial machine, an imaging apparatus, a sound collector, a medical device, a network home appliance, an automobile (connected car), a notebook personal computer (PC), a mobile phone, a smartphone, a tablet terminal, a game machine, a personal digital assistant (PDA), a digital camera, a wearable PC or desktop PC, or the like.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

The invention claimed is:

1. An information processing apparatus comprising:

at least one device; and circuitry configured to perform at least one process using the at least one device, the circuitry being configured to:

control access to each device from each process based on access restriction information for setting an access restriction to each device from each process;

acquire diagnostic information from each device;

detect an abnormal access to a particular device from a particular process based on the diagnostic information; and modify the access restriction information to prohibit access to the particular device from the particular process when the abnormal access is detected, wherein the circuitry periodically acquires the diagnostic information from each device, the diagnostic information includes information indicating a number of times a power of the particular device is turned on and off, the abnormal access is detected by comparing the number of times the power of the particular device is turned on and off indicated in the acquired diagnostic information and the number of times the power of the particular device is turned on and off indicated in diagnostic information acquired in a preceding period, and the circuitry determines that the abnormal access has occurred in a case where a difference between the number of times the power of the particular device is turned on and off indicated in the acquired diagnostic information and the number of times the power of the particular device is turned on and off indicated in the diagnostic information acquired in the preceding period is greater than or equal to a predetermined threshold value.

2. The information processing apparatus of claim 1, wherein the circuitry is further configured to acquire an access log to at least one device from at least one process, and identifies, based on the access log, the particular process that is an access source to the particular device when the abnormal access is detected, and modifies the access restriction information to prohibit access to the particular device from the process that is identified.

3. A method for controlling an information processing apparatus that performs at least one process using at least one device, the method comprising:

controlling access to each device from each process based on access restriction information for setting an access restriction to each device from each process;

acquiring diagnostic information from each device;

detecting an abnormal access to a particular device from a particular process on the diagnostic information; and modifying the access restriction information to prohibit access to the particular device from the particular process when the abnormal access is detected, wherein the diagnostic information is periodically acquired from each device, the diagnostic information includes information indicating a number of times a power of the particular device is turned on and off, the abnormal access is detected by comparing the number of times the power of the particular device is turned on and off indicated in the acquired diagnostic information and the number of times the power of the particular device is turned on and off indicated in diagnostic information acquired in a preceding period, and it is determined that the abnormal access has occurred in a case where a difference between the number of times the power of the particular device is turned on and off indicated in the acquired diagnostic information and the number of times the power of the particular device is turned on and off indicated in the diagnostic information acquired in the preceding period is greater than or equal to a predetermined threshold value.

4. The method of claim 3, further comprising:

acquiring an access log to at least one device from at least one process; and identifying, based on the access log, the particular process that is an access source to the particular device when the abnormal access is detected, wherein the modifying includes modifying the access restriction information to prohibit access to the particular device from the process that is identified.

5. A non-transitory recording medium which, when executed by one or more processors, cause the processors to perform a method for controlling an information processing apparatus that performs at least one process using at least one device, the method comprising:

controlling access to each device from each process based on access restriction information for setting an access restriction to each device from each process;

acquiring diagnostic information from each device;

detecting an abnormal access to a particular device from a particular process on the diagnostic information; and modifying the access restriction information to prohibit access to the particular device from the particular process when the abnormal access is detected, wherein the diagnostic information is periodically acquired from each device, the diagnostic information includes information indicating a number of times a power of the particular device is turned on and off, the abnormal access is detected by comparing the number of times the power of the particular device is turned on and off indicated in the acquired diagnostic information and the number of times the power of the particular device is turned on and off indicated in diagnostic information acquired in a preceding period, and it is determined that the abnormal access has occurred in a case where a difference between the number of times the power of the particular device is turned on and off indicated in the acquired diagnostic information and the number of times the power of the particular device is turned on and off indicated in the diagnostic information acquired in the preceding period is greater than or equal to a predetermined threshold value.

* * * * *